US011281472B2

(12) United States Patent
Chaiken et al.

(10) Patent No.: US 11,281,472 B2
(45) Date of Patent: Mar. 22, 2022

(54) SYSTEM AND METHOD FOR SECURING COMPROMISED INFORMATION HANDLING SYSTEMS

(71) Applicant: DELL PRODUCTS, LP, Round Rock, TX (US)

(72) Inventors: Craig Chaiken, Pflugerville, TX (US); Balasingh P. Samuel, Round Rock, TX (US); Steven Downum, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 184 days.

(21) Appl. No.: 16/780,383

(22) Filed: Feb. 3, 2020

(65) Prior Publication Data
US 2021/0240490 A1 Aug. 5, 2021

(51) Int. Cl.
*G06F 9/44* (2018.01)
*G06F 9/4401* (2018.01)
*H04L 9/32* (2006.01)
*G06F 21/57* (2013.01)
*G06F 11/22* (2006.01)
*G06F 9/455* (2018.01)

(52) U.S. Cl.
CPC ........ *G06F 9/4411* (2013.01); *G06F 9/45558* (2013.01); *G06F 11/2273* (2013.01); *G06F 21/572* (2013.01); *G06F 21/577* (2013.01); *H04L 9/3247* (2013.01); *G06F 11/2284* (2013.01); *G06F 2009/45579* (2013.01); *G06F 2009/45587* (2013.01)

(58) Field of Classification Search
CPC ............... G06F 9/4411; G06F 9/45558; G06F 11/2273; G06F 21/572; G06F 21/577; G06F 11/2284; G06F 2009/45579; G06F 2009/45587; H04L 9/3247
See application file for complete search history.

(56) References Cited

U.S. PATENT DOCUMENTS

| | | | |
|---|---|---|---|
| 6,725,379 B1 | 4/2004 | Dailey | |
| 7,213,152 B1 * | 5/2007 | Gafken | G06F 21/572 713/187 |
| 7,809,583 B2 * | 10/2010 | Rusman | G06F 21/10 705/1.1 |
| 8,635,264 B2 * | 1/2014 | O'Connor | G06Q 20/34 709/202 |
| 8,874,922 B2 * | 10/2014 | Jaber | G06F 21/572 713/176 |
| 9,842,210 B2 * | 12/2017 | Rose | G06F 21/57 |
| 10,489,582 B1 * | 11/2019 | Raman | G06F 11/3684 |
| 10,534,918 B1 * | 1/2020 | Davidi | G06F 8/65 |

(Continued)

*Primary Examiner* — Aurel Prifti
(74) *Attorney, Agent, or Firm* — Larson Newman, LLP

(57) ABSTRACT

An information handling system includes a basic input/output system having a virtual advanced configuration and power interface device. A processor may download a device driver for a particular virtual advanced configuration and power interface device, wherein the device driver includes a code for a security feature and a signed file that includes a list of identifiers of compromised information handling systems. The processor may determine whether the information handling system is compromised based on the list of identifiers of compromised information handling systems in the signed file, and execute the code for the security feature.

20 Claims, 6 Drawing Sheets

(56) References Cited

U.S. PATENT DOCUMENTS

| | | | |
|---|---|---|---|
| 11,120,136 B1* | 9/2021 | BeSerra | G06F 9/4401 |
| 2004/0243534 A1* | 12/2004 | Culter | G06F 9/4411 |
| 2006/0288422 A1* | 12/2006 | Liu | G06F 21/572 |
| | | | 726/26 |
| 2008/0065897 A1 | 3/2008 | Jayaram et al. | |
| 2008/0196081 A1* | 8/2008 | Hajji | G06F 21/57 |
| | | | 726/1 |
| 2010/0162242 A1* | 6/2010 | Grouzdev | G06F 9/45558 |
| | | | 718/1 |
| 2012/0291023 A1* | 11/2012 | Lu | G06F 9/4411 |
| | | | 717/178 |
| 2014/0007069 A1* | 1/2014 | Cavalaris | G06F 8/654 |
| | | | 717/170 |
| 2014/0040605 A1* | 2/2014 | Futral | G06F 21/572 |
| | | | 713/2 |
| 2014/0068594 A1* | 3/2014 | Young | G06F 21/572 |
| | | | 717/172 |
| 2014/0365755 A1* | 12/2014 | Liu | G06F 21/572 |
| | | | 713/2 |
| 2015/0220308 A1* | 8/2015 | Condon | G06F 8/20 |
| | | | 717/104 |
| 2015/0268970 A1* | 9/2015 | Mudusuru | G06F 9/4411 |
| | | | 713/1 |
| 2016/0202964 A1* | 7/2016 | Butcher | G06F 8/65 |
| | | | 717/172 |
| 2016/0267284 A1 | 9/2016 | Willis et al. | |
| 2016/0371163 A1* | 12/2016 | Swierk | G06F 11/2294 |
| 2017/0024223 A1* | 1/2017 | Wynn | G06F 9/4406 |
| 2018/0054456 A1* | 2/2018 | Ground | H04L 63/1433 |
| 2018/0075242 A1* | 3/2018 | Khatri | H04L 9/3263 |
| 2018/0322269 A1* | 11/2018 | Arora | G06F 3/04883 |
| 2018/0324162 A1 | 11/2018 | Teshome et al. | |
| 2018/0365424 A1* | 12/2018 | Callaghan | G06F 21/575 |
| 2019/0026118 A1* | 1/2019 | Warkentin | G06F 8/656 |
| 2019/0042725 A1* | 2/2019 | Ruan | G06F 8/654 |
| 2019/0325664 A1* | 10/2019 | Oronte | H04W 8/005 |
| 2019/0332775 A1* | 10/2019 | Savage | H04L 9/321 |
| 2020/0014705 A1* | 1/2020 | Cui | H04L 63/20 |
| 2020/0026505 A1* | 1/2020 | Olderdissen | G06F 9/44526 |
| 2020/0074086 A1* | 3/2020 | Bulygin | G06F 21/54 |
| 2020/0218810 A1* | 7/2020 | Pereira Silveira | G06F 21/51 |
| 2020/0364340 A1* | 11/2020 | Khoruzhenko | G06F 21/577 |
| 2020/0401695 A1* | 12/2020 | Mayo | G06F 21/64 |

\* cited by examiner

SYSTEM AND METHOD FOR SECURING COMPROMISED INFORMATION HANDLING SYSTEMS

FIELD OF THE DISCLOSURE

The present disclosure generally relates to information handling systems, and more particularly relates to securing compromised information handling systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a basic input/output system having a virtual advanced configuration and power interface device. A processor may download a device driver for a particular virtual advanced configuration and power interface device, wherein the device driver includes a code for a security feature and a signed file that includes a list of identifiers of compromised information handling systems. The processor may determine whether the information handling system is compromised based on the list of identifiers of compromised information handling systems in the signed file, and execute the code for the security feature.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
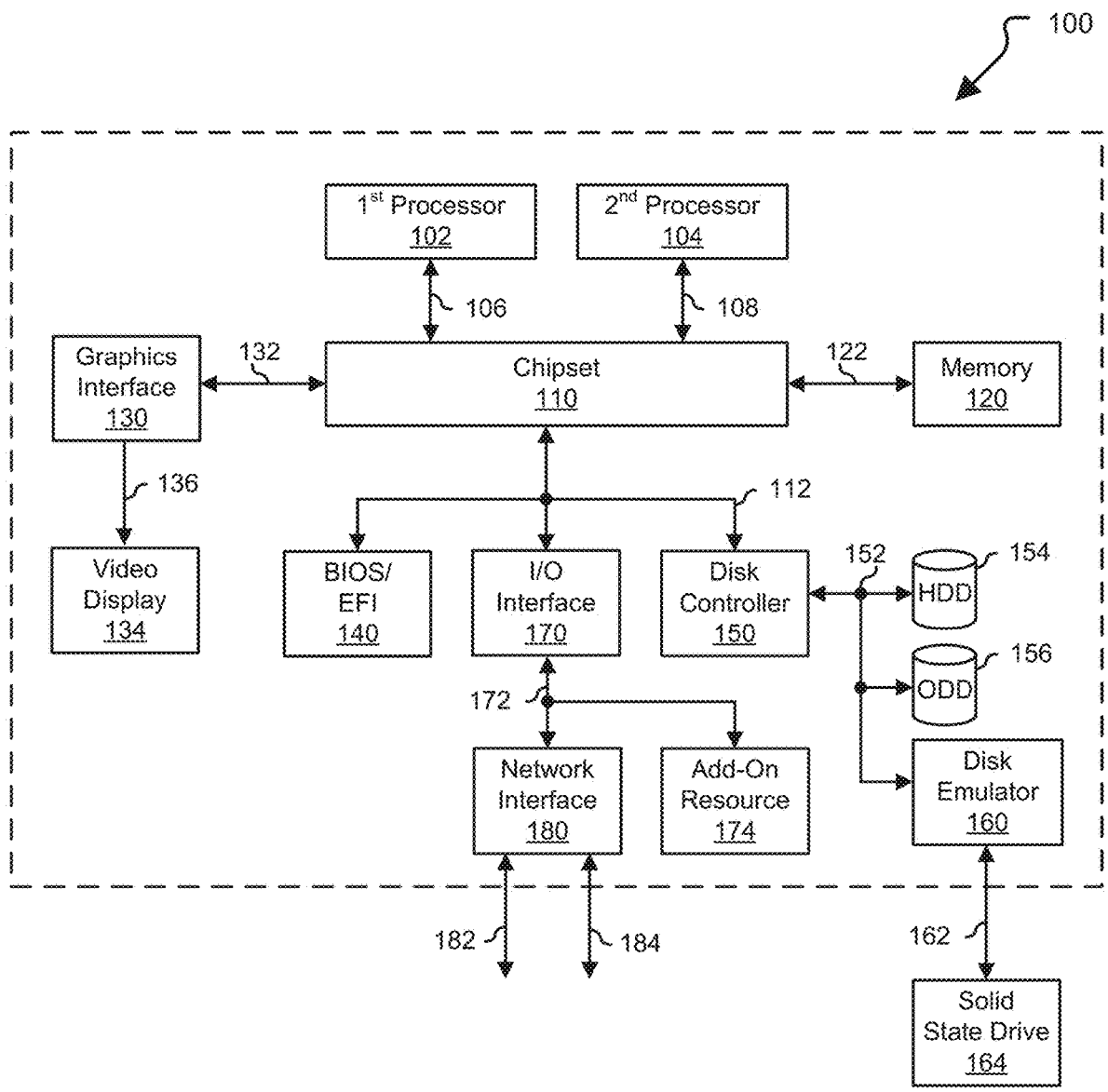
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above and operates to perform one or more of the methods described above. Information handling system 100 includes a processors 102 and 104, a chipset 110, a memory 120, a graphics adapter 130, include a basic input and output system/unified extensible firmware interface (BIOS/UEFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics adapter 130 is connected to chipset 110 via a graphics interface 132 and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/UEFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a Serial Peripheral Interface (SPI), a Universal Serial Bus (USB), another interface, or a combination thereof. BIOS/UEFI module 140 includes BIOS/UEFI code operable to detect resources within information handling system 100, to provide drivers for the resources, initialize the resources, and access the resources. BIOS/UEFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

One particular type of information handling system is portable computing system such as a laptop, notebooks, a cellular telephone, a palm-held computer system, etc. Portable computing systems allow stand-alone computing and typically have their own power supplies, modems, and storage devices. Portable computing systems typically include data that may be valuable. For example, portable computing systems of employees may include corporate data such as source code, personally identifiable information of other employees, etc. The ability to control unauthorized access to data or render at least a portion of the portable computing system unusable in certain situations such as when the portable computing system is misplaced, lost, or stolen is important. Other situations that may prompt an owner of the portable computing system to at least restrict access to the portable computing system or a portion thereof may include an employer terminating an employee, a parent restricting access of a child, etc. A system and method of the current disclosure allow for remotely securing the information handling system by applying one or more security features to limit access or render one or more components of the information handling system unusable. The system and method of the current disclosure may also download the data in the information handling system or forensically destroy the data, encrypt the data, and/or render the data inaccessible. These security features may be applied to the compromised information handling system without deploying an agent or initial setup to the information handling system prior to the it being compromised.

Figure 2:
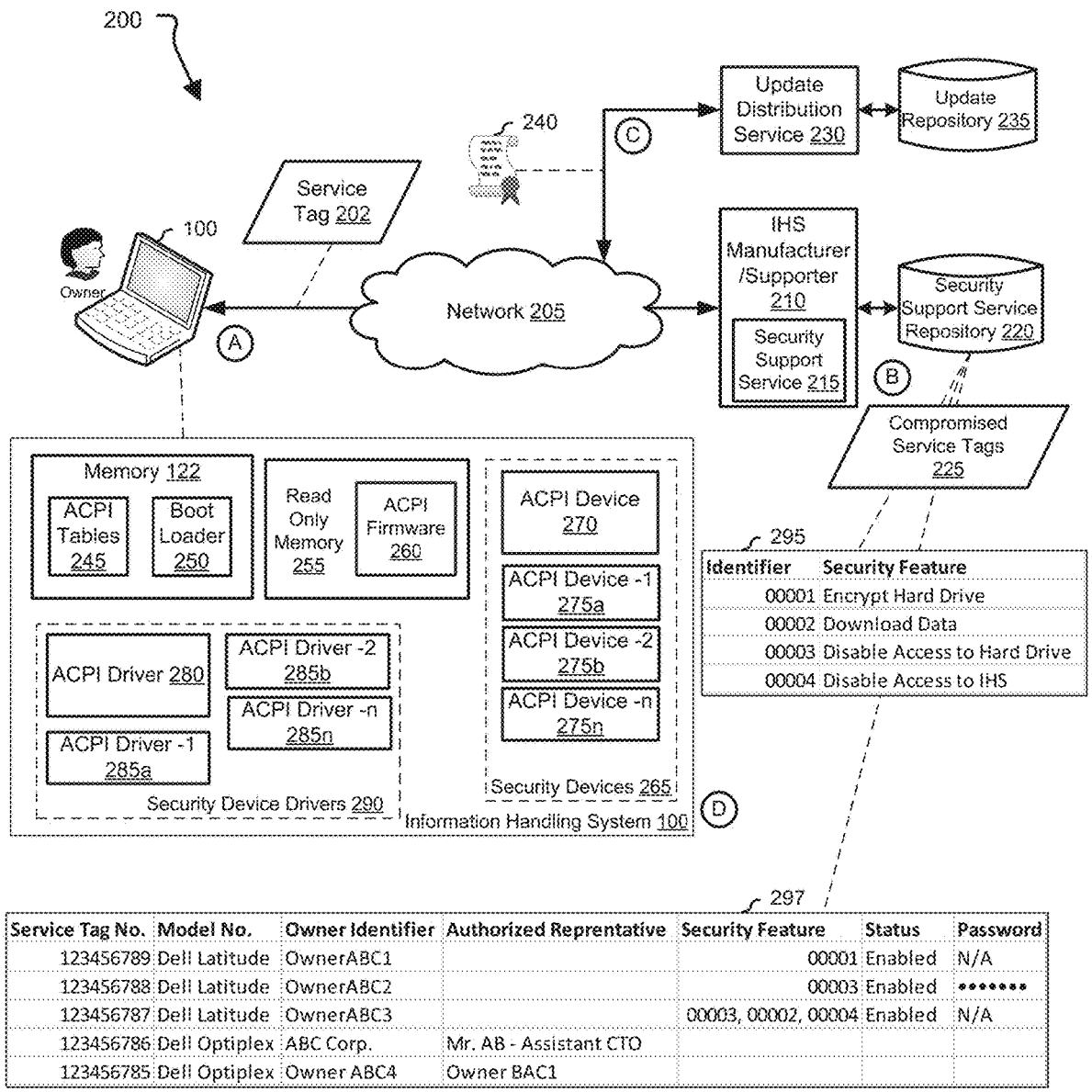
FIG. 2 illustrates a security system for securing compromised information handling systems, according to an embodiment of the present disclosure.

FIG. 2 illustrates a security system 200 for securing compromised information handling systems. Security system 200 includes information handling system 100, an information handling system manufacturer/supporter 210, and an update distribution service 230. Information handling system manufacturer/supporter 210 may communicate with information handling system 100 and update distribution service 230 via a network 205. Information handling system manufacturer/supporter 210 includes a security support service 215 that maintains a list of the compromised information handling systems such as compromised service tags 225 at a security support service repository 220. Update distribution service 230 maintains updates to information handling systems in an update repository 235.

Information handling system 100 may be a compromised information handling system. As used herein, compromised information handling systems include stolen, lost, misplaced, or otherwise deemed compromised by its owner. For example, the compromised information handling system may include an information handling system in possession of an employee whose relationship with his employer has ended or about to end such as a laid off, terminated or soon to be laid off or terminated employee. The owner of the compromised information handling system such as the employer may seek to secure the compromised information handling system by applying one or more security features that limit or disable access to the compromised information handling system and/or its data.

Information handling system 100 includes security devices 265 and security device drivers 290 that may be used to execute the security features selected by the owner. Security devices 265 include advanced configuration and power interface (ACPI) device 270 and ACPI devices 275a-275n. ACPI device 270 may be a parent device of children ACPI devices 275a-275n. Security device drivers 290 include ACPI driver 280 and ACPI drivers 285a-285n. ACPI driver 280 is the device driver for ACPI device 270. ACPI drivers 285a-285n are device drivers for ACPI devices 275a-275n.

The ACPI devices may be added to the BIOS using an ACPI source language (ASL) such as during power-on self-test (POST). By adding the ACPI devices to the BIOS, the security features selected by the owner of the compromised information handling system may be enabled on any operating system even after the storage device such as an HDD or a solid-state drive (SSD) is re-imaged. In another embodiment, each of the devices would be an independent ACPI device with no parent-child relationship. In yet another embodiment, security devices 265 are not ACPI devices. For example, security devices 265 may be PCI devices, logical devices, system on a chip (SOC) devices, memory-mapped I/O (MMIO) devices, etc.

The manufacturer of information handling system 100 may provide security services or support to owners and/or representatives of the compromised information handling systems. In another embodiment, the manufacturer may provide the support via an authorized third-party. The third-party may be a company distinct from the manufacturer that is tasked to provide the security services. When the information handling system is compromised, the owner or authorized representative may notify the manufacturer or authorized third party to report the current status of the information handling system. He or she may provide credentials via a customer representative, a web interface or a mobile application for example. After verifying the provided credentials, the manufacturer or the authorized third party may record the information associated with the compromised information handling system and/or its owner in a list of compromised information handling system.

The list of compromised information handling systems maintained by information handling system manufacturer/supporter 210 may include other information regarding the compromised information handling system such as unique identifier and/or service tag of the compromised information handling system, a model name/number, a name and/or contact information of the owner and/or an authorized representative, status of the compromised information handling system, security features implemented at the compromised information handling systems, applicable password(s) if any, etc. as shown in table 297. Information handling system manufacturer/supporter 210 may also maintain a menu or list of security features that can be implemented or executed at the compromised information handling system as shown in table 295. The updated list of compromised information handling system may be pushed to web facing servers of the manufacturer and/or the authorized third party and are now available for download by information handling systems that includes the security system devices. The list is also available for update services such as update distribution service 230. In one embodiment, the information handling system manufacturer/supporter 210 may also provide a listing of available updates that have been approved for distribution.

Update distribution service 230 may be configured to provide the latest updates to device drivers such as the security device drivers 290 of information handling system 100 via network 205. In certain scenarios, update distribution service 230 may be provided by the provider of the operating system that is utilized by information handling system 100. Accordingly, in some scenarios where information handling system 100 uses a Windows® operating system, the update distribution service 230 may be provided as a component of the Windows Update software update service.

Updating the security device drivers 290 may be necessary in order to apply the security features selected by the owner if the information handling system is compromised and/or to take advantage of new functionality provided by the updated device drivers. The security system driver updates may also include signed files such as signed file 240 that includes a list of the service tags of the compromised information handling systems. Revisions to the security device drivers may be based on updates to the list of the service tags such as when an information handling system is reported as compromised and/or recovered. The security support service 215 may be configured to track information regarding the driver versions or revisions of security device drivers 290. The actual update files may be stored and retrieved as necessary from update repository 235. In another embodiment, the information handling system 100 or in particular the security device driver, may be configured to query update distribution service 230 periodically to determine whether the information handling system has been compromised and/or needs an update.

In another embodiment, because the manufacturer of the information handling system may have partnerships with OEMs, security features may be pushed to a hardware component in lieu of or in addition to the security device drivers. For example, the security features may be pushed to a critical device such as a keyboard, a microphone, a display device, a modem, a storage device, etc. upon determination that the information handling system 100 has been compromised. In another embodiment, the virtual devices associated with the security features may be added to the information handling system upon the determination that the information handling system has been compromised. In yet another embodiment, a library of the security features also referred to as a security library may be available to be downloaded and/or integrated as additional functionality to a third-party device driver. For example, the library of the security features may only be enabled and/or start executing if sub vendor ID is the manufacturer of the information handling system.

The security features may be executed as a background process and may be hidden such as from view in task manager, so that the current possessor of the compromised information handling system may remain unaware that certain security features are being applied. For example, the current possessor may be unaware that data in "My Documents" are being downloaded until after the data has been downloaded and/or erased from the storage device. The owner may also set up a password so that the current possessor may be unable to use the information handling system. The owner may set up a sequence of the security features to be applied. For example, the owner may set it up that the password may be effective after the data has been downloaded.

When the information handling system that was compromised has been recovered back by the owner, the owner can also update the manufacturer or third-party security service provider that the information handling system has been recovered. The manufacturer and/or third-party security service provider may remove the service tag of the recovered information handling system from the list of compromised information handling systems. The manufacturer and/or third party provide an update to the security device drivers for download that will disable the applied security feature. If the owner has set up a password so that the current possessor may be unable to use the information handling system, the owner may verify his or her identity with the manufacturer or third-party security service provider and retrieve the password. The owner may then enter the password to gain access to the recovered information handling system.

FIG. 2 is annotated with a series of letters A-D. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

Prior to stage A, virtual ACPI devices, such as security devices 265, may have been added to information handling system 100 at manufacture. These virtual ACPI devices may have been kept at a disabled state until information handling system 100 is compromised. After determining the security features selected by the owner, the virtual ACPI device driver may determine whether the virtual ACPI device associated with the security feature is enabled. If the virtual ACPI device is not enabled, then the device driver enables the virtual ACPI device. Once enabled, the virtual ACPI device driver executes code associated with the security feature. If the child ACPI device is enabled, then the device driver proceeds to determine the next security feature until all the security features selected by the owner has been executed. Information regarding the ACPI devices may be included in ACPI tables 245.

The virtual ACPI devices may also be added during the POST. A security library of the virtual ACPI devices may also be added to one or more selected critical drivers of the information handling system such as a graphics driver, a keyboard driver, a mouse driver, a display driver, etc. Security devices 265 may also have been added as child devices to one or more selected hardware components or devices such as to a keyboard, a microphone, a display device, a modem, a graphics driver, etc. The selected hardware component or device may be a critical hardware component or device of the information handling system. Each security device may be associated with a security feature that can be selected by the owner of the compromised information handling system.

At stage A, when an information handling system such as information handling system 100 is compromised, an owner or an authorized representative may call a customer representative of information handling system manufacturer/supporter 210. Information handling system manufacturer/supporter 210 may be the manufacturer of information handling system 100 or an authorized third party that handles security for compromised information handling systems. The owner may provide credentials to verify that he or she is the rightful owner or authorized representative of information handling system 100. The owner or an authorized representative of information handling system 100 may simply be referred herein as the owner.

After the owner is verified, the customer representative may offer a menu of security features that can be enabled at information handling system 100. The security features includes disabling the information handling system, determining the location of the information handling system, offloading files in one or more storage devices of the information handling system, erasing the storage device of information handling system 100 such as HDD 154 or ODD 156, rending information handling system 100 useless such as by applying a password in the BIOS, operating system, and/or storage device only known to the manufacturer or the authorized third party, etc. The password may be generated based on a private key at the manufacturer of the information handling system or an authorized third party. The owner may select one or more of the aforementioned security features to be applied to information handling system 100. The owner may also elect a sequence of how the security features may be applied or enabled. The security features may be a fee for service option, wherein the owner may pay for each one of the security features to be applied.

At stage B, after payment of the owner if any, the customer representative may add the service tag of information handling system 100 to the list of compromised information handling systems such as compromised service tags 225. Table 297 illustrates an example of compromised service tags 225. A signed file associated with each one of the security features. The signed files of the selected security features may be updated with the service tag of information handling system 100. A version or revision number of the virtual ACPI driver associated with the updated signed file may be incremented when the signed file is updated. The revision number of the security system driver may be incremented each time a stolen service tag payload file such as signed file 240 is updated. This allows application store or update or device driver deployment service such as Windows Update to update the device driver and process the updated payload.

At stage C, based on the change in the revision number of the security device driver, update distribution service 230 may update the security device driver. The payload of the update may include signed file 240. In another embodiment ACPI driver associated with the security device driver may download the update from update distribution service 230. In some embodiment, the ACPI drivers are updated during the boot process. When information handling system 100 is powered on, boot code stored in read only memory 255, in particular the system firmware which includes ACPI firmware 260 takes control. After the system firmware conducts power-on self-tests of all the devices, ACPI firmware 260 is executed to load ACPI tables 245 into memory 122. One of the tables in ACPI tables 245 defines a tree of ACPI devices such as security devices 265. Boot loader 250 loads the operating system which then binds each ACPI driver such as one of security device drivers 290 its associated ACPI device.

At stage D, the security device driver determines that the service tag of information handling system 100 is included in the list of compromised service tags. The security device driver may verify the authenticity of the signed file prior to determining whether the service tag of the information handling system 100 is included in the list of compromised service tags. After determining that the service tag is included in the list of the compromised service tags, the security device driver executes code to apply the service feature to the information handling system. After applying the security feature, the security device driver updates the manufacturer of the information handling system or a trusted third-party provider.

Figure 3:
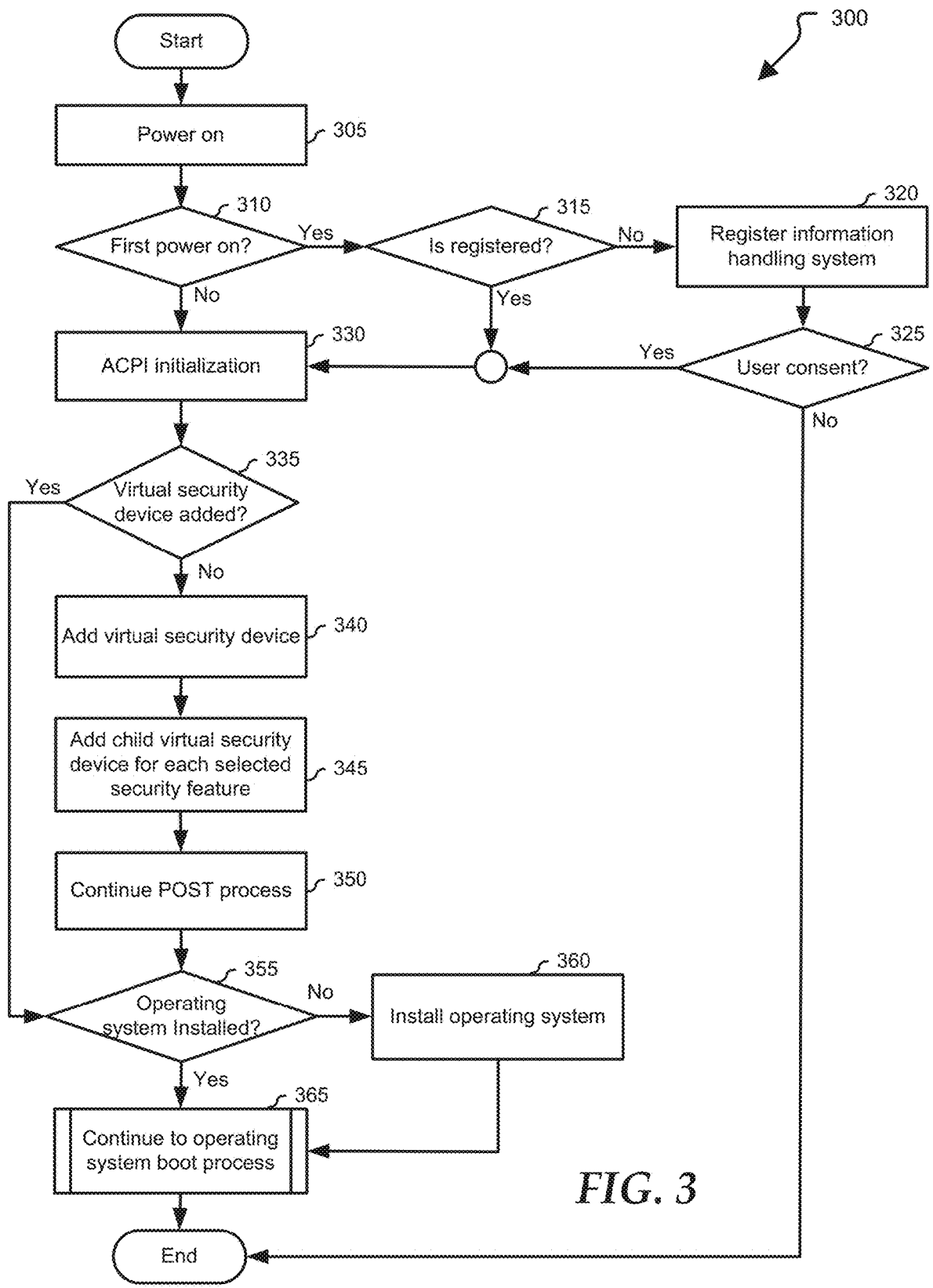
FIGS. 3, 4, 5, and 6 are flowcharts illustrating an example of a method for securing compromised information handling systems, according to an embodiment of the present disclosure.

FIG. 3 illustrates a method 300 for implementing security features to a compromised information handling system at POST. The method 300 typically starts at block 305 where a user turns the power-on of an information handling system supplying current to the information handling system. The information handling system begins operation and a decision is made as to whether the power-on at the information handling system is an initial power-on of the information handling system that is the information handling system is turned on for the first time, in decision block 310. If the power-on is the initial power-on of the information handling system, then the "YES" branch of decision block 310 is taken and the method proceeds to decision block 315. If the power-on is not the initial power-on of the information handling system, then the "NO" branch of decision block 310 is taken and the method proceeds to block 330 as described below.

At decision block 315, a decision is made on whether the information handling system is registered with the manufacturer of the information handling system such as Dell® Corporation. If the information handling system is registered, then the "YES" branch of decision block 315 is taken and the method proceeds to block 330. If the information handling system is not registered, then the "NO" branch of decision block 315 is taken and the method proceeds to block 320.

At block 320, the information handling system is registered with the manufacturer. Information regarding the information handling system such as service tag number, model details of the information handling system, and information regarding the owner of the information handling system such as a name and address of the owner may be provided. In addition, consent to implement a security system that would allow certain security features to be executed when the information handling system is compromised may be obtained. In another embodiment, consent to implement the security system is assumed by default such as by agreeing to terms of purchase of the information handling system.

At decision block 325, a decision is made on whether the user consents to enable the security device. If the user consents, then the "YES" branch of decision block 325 is taken and the method proceeds to block 330. If the user does not consent, then the "NO" branch of decision block 325 is taken, the information handling system proceeds with normal boot operation without setting up the security system and the method ends. The method may also set a flag to identify that the user does not consent to enable the security system for the next boot where at next boot, the information handling system proceeds to normal boot operation.

At block 330, the method performs ACPI initialization. The BIOS/UEFI module operates to perform a POST that identifies and initializes the hardware components. The BIOS/UEFI uses the information during firmware initialization to update ACPI tables as necessary with various platform configurations and power interface data before passing control to the bootstrap loader. The ACPI tables are the central data structure of an ACPI-based system. The ACPI tables contain definition blocks that describe all the hardware that can be managed through the ACPI. After the initialization, the method proceeds to decision block 335.

At decision block 335, a decision is made on whether a virtual security device for the compromised information handling system has been added. If the virtual security device has been added, then the "YES" branch of decision block 335 is taken and the method proceeds to decision block 355. If the virtual security device has not been added, then the "NO" branch of decision block 335 is taken and the method proceeds to block 340.

At block 340, the method creates or adds the virtual security device to the ACPI subsystem. The virtual security device may be a parent virtual device wherein child virtual devices may be added. The virtual security device may be added using ACPI source language (ASL) code. ASL is the language used to define ACPI objects and to write control methods. The virtual security device may also be referred to herein as a virtual ACPI device or simply an ACPI device. The virtual security device may include various attributes or properties such as a hardware identifier, a non-removable property, a non-disableable property, a hidden property, etc. After adding the virtual security device, the method proceeds to block 345.

At block 345, the method creates or adds a child virtual security device for each security feature available for the security system. The child virtual security devices to be added to the virtual security device. The method determines the child virtual security devices to be added based on a list of the security features from the manufacturer or the third party that provides the security support service to the compromised information handling systems. If so, the child virtual security devices may be disabled until enabled. In another embodiment, the method determines the child virtual security device to be added based on the security features to be applied to the compromised information handling system as selected by the owner. Prior to creating or adding the child virtual security device, the method may determine if child virtual security device has already been added. After creating or adding the child virtual security device, the method proceeds to block 350.

At block 350, the method continues to finish the POST process and determine whether an operating system is installed in the information handling system at decision block 355. If the operating system is not installed, then the "NO" branch of decision block 355 is taken and the method proceeds to block 360 where the operating system is installed. If the operating system is installed, then the "YES" branch of decision block 355 is taken and the method proceeds to block 365 where the POST process proceeds to load the operating system from the boot device into random access memory (RAM). Once the operating system is safely loaded into the RAM, the method starts the operating system.

Figure 4:
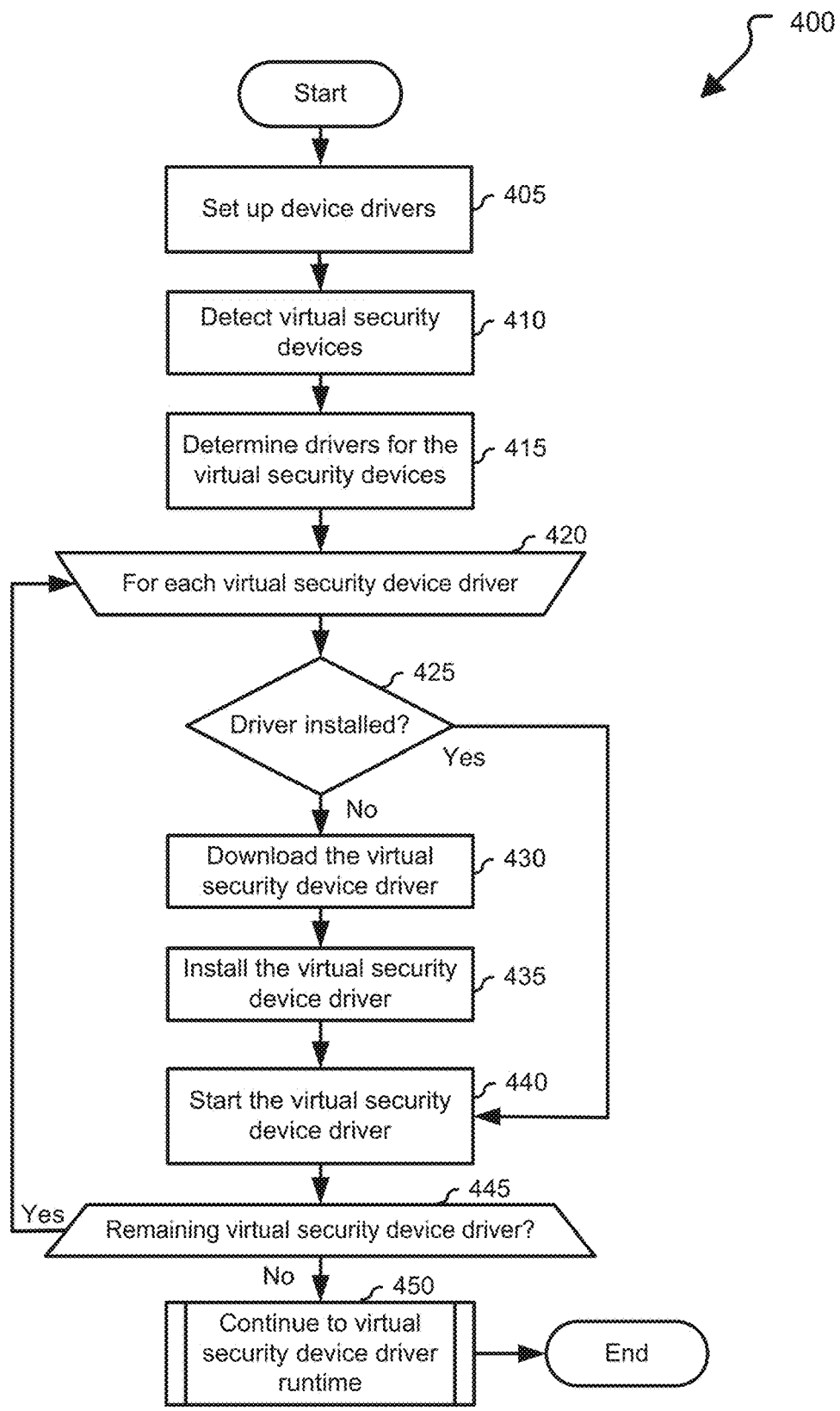

FIG. 4 illustrates a method 400 for implementing security features to a compromised information handling system at an operating system boot. In particular, method 400 is a detailed illustration of block 365 of FIG. 3. Method 400 typically starts at decision block 405 where the method finds out what devices exist on the information handling system. Typically, a plug and play (PnP) manager determines which drivers are required to support the devices and loads those drivers. Generally, the physical hierarchy of the devices in the information handling system determines the order in which the PnP manager loads the drivers. Typically, the PnP manager configures devices starting with the root devices and then configures the child devices of the root devices. The PnP manager loads the drivers for each device as the device is configured. The method proceeds to block 410.

At block 410, the PnP manager detects the virtual security devices that were created or added during POST. In addition, the PnP manager may assign a unique device identifier to the detected virtual security devices if one has not yet been assigned. The method proceeds to block 415 where the PnP manager determines the virtual security device drivers for the detected virtual security devices. The method may keep track of the virtual security device drivers via a data structure such as a list and proceed to traverse the list to process each virtual security driver at block 420. The virtual security driver being processed may be referred herein as a current driver. The method proceeds to decision block 425, where the method determines if the current driver is installed. If the current driver is installed, then the "YES" branch of decision block 425 is taken and the method proceeds to block 440. If the current driver is not installed, then the "NO" branch of decision block 425 is taken and the method proceeds to block 430.

At block 430, the PnP manager downloads or receives the current driver and proceeds verify the signature of the payload such as a signed file that includes service tags of compromised information handling systems. The method proceeds to block 435 where the PnP manager installs the downloaded driver and then proceeds to block 440 where the PnP manager starts the installed driver. After starting the current driver, the method proceeds to block 445 where the PnP manager determines if there is a virtual security driver remaining to be processed. If there is a virtual security driver remaining to be processed, then the "YES" branch of block 445 is taken and the method proceeds to block 420. If there is no virtual security driver remaining to be processed, then the "NO" branch of block 445 is taken and the method proceeds to block 450 where the operating system finishes the boot process and the method continues to the driver runtime routine and then end.

Figure 5:
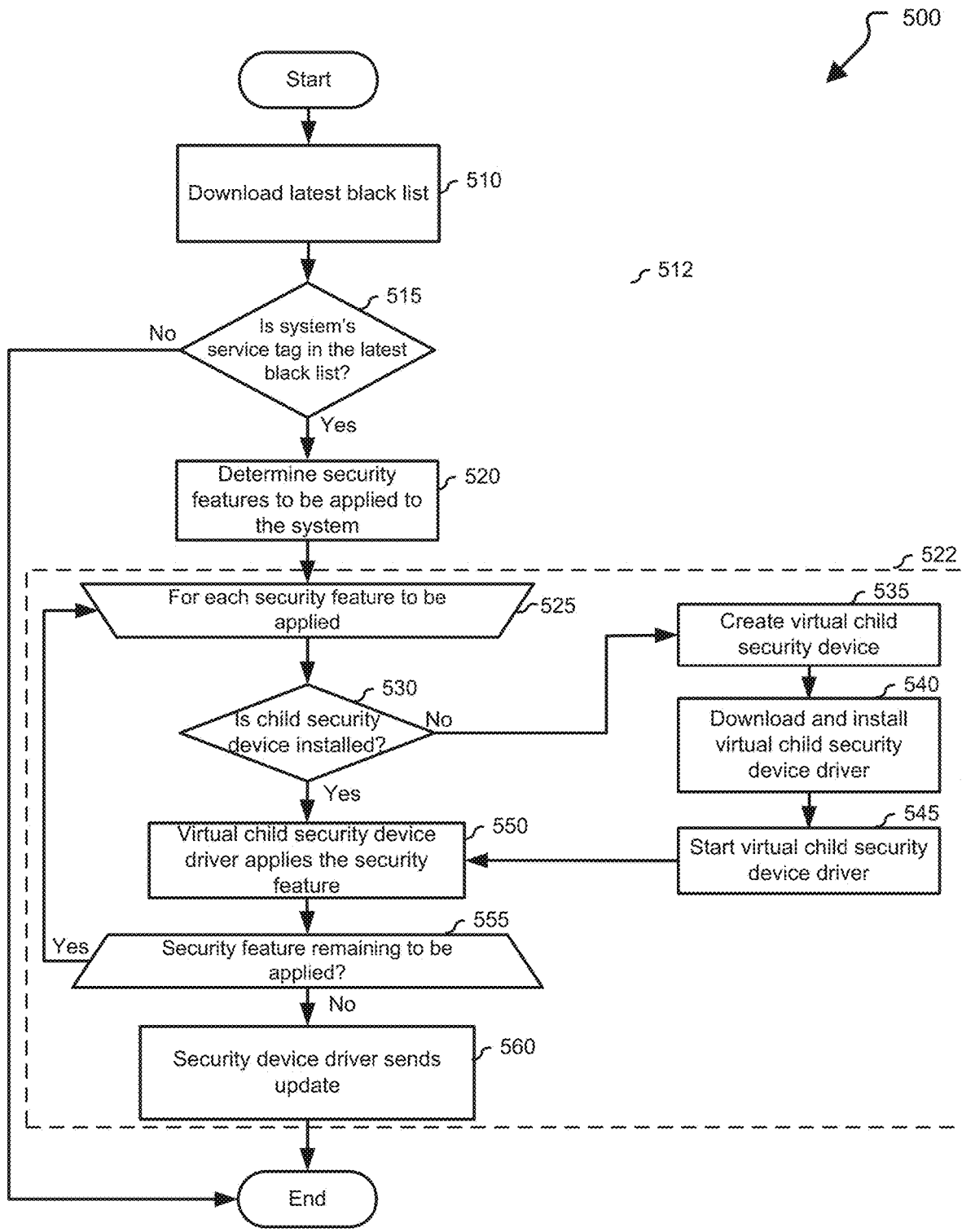

FIG. 5 illustrates a method 500 for implementing security features to a compromised information handling system at driver runtime. In particular, method 500 is a detailed illustration of block 450 of FIG. 4. Typically, the method 500 starts at block 510. In addition, virtual security device drivers associated with security features to be applied at a compromised information handling system have already been started at block 440 of FIG. 4.

At block 510, the parent virtual security device driver downloads the latest list of service tags of information handling systems that were compromised also referred to herein as a blacklist. After downloading the blacklist, the method proceeds to decision block 515 where a decision is made on whether the service tag of the information handling system is in the latest blacklist. If the service tag of the information handling system is in the latest blacklist, then the "YES" branch of decision block 515 is taken and the method proceeds to block 520. If the service tag of the information handling system is not in the latest blacklist, then the "NO" branch of decision block 515 is taken and the method ends.

At block 520, the method determines the security features to be applied or executed at the information handling system. In particular, the parent virtual security device driver determines the security features. These security features are based on the preferences selected by the owner of the information handling system. The owner of the information handling system may choose one or more security features which may include the following: erase the storage device, encrypt the data in the storage where the key to decrypt the data is only known to the manufacturer of the information handling system or a trusted party, require a password or change existing password to access the storage device or the information handling system known only to the manufacturer of the information handling system or trusted third party, require a password for the BIOS to start which is only known to the manufacturer of the information handling system, download files from the storage device of the information handling system such as from "My Documents" section, freeze the operating system and/or display a information such as to call a phone number, etc. The password may be based on information associated with the information handling system such as the service tag, model identifier. In addition, the password may also be based on a private key. The password may be set by the driver of the virtual ACPI device upon request of the owner to be enabled.

The owner may also choose to sequence the execution of the chosen security features. For example, the owner may choose to first require a password for the storage device and then download files from the storage before finally erasing the contents of the storage device. The customer may also choose how to erase the contents of the storage device, such as to delete all the data in the storage device, to overwrite all the data in the storage device, or to forensically erase all the data in the storage device. The method may put the options selected by the owner in a data structure or a list. The method may also put the options in accordance with the sequence. The method proceeds to block 525 of block 522. At block 522 the security features are applied to the information handling system. In this embodiment, as shown block 522 includes block 525, decision block 530, block 535, block 540, block 545, block 550, block 555, and block 560.

At block 525, the method traverses the data structure based on the ordered sequence if any and proceeds to process each of the security features beginning at decision block 530. The security feature being processed may be referred to as a current security feature. At decision block 530, the method determines whether a virtual security device associated with the current security feature is installed in the information handling system. If the virtual security device associated with the current security feature is installed, then the "YES" branch of decision block 530 is taken and the method proceeds to block 550. If the virtual security device associated with the current security feature is not installed, then the "NO" branch of decision block 530 is taken and the method proceeds to block 535.

At block 535, the method creates or adds a virtual security device associated with the current security feature. The virtual security device may be a child device of the parent virtual security device. After creating the virtual security device, the method proceeds to block 540 where the method downloads and installs a driver for the virtual security device. The driver may include a payload that includes code associated with security feature to be applied. The payload may include a signed file containing the list of compromised information handling system service tags and model identifiers. After installing the child device driver, the method proceeds to block 545 where the method is triggered to start the virtual security device driver. If the service tag of the information handling system is not included in the signed file, then the virtual security device driver may not start. Starting the virtual security device driver in turn triggers the execution of the security feature associated with the virtual security device driver at block 550.

At block 550, the virtual security device driver executes the code associated with the security feature. The method then proceeds to block 555, where the method determines if there is any security feature remaining to be processed. If there is a security feature remaining to be applied, then the "YES" branch of block 555 is taken and the method proceeds to block 525. If there is no security feature remaining to be applied, then the "NO" branch of block 555 is taken and the method proceeds to block 560.

At block 560, the virtual parent security driver sends an update to the manufacturer of the information handling system or the authorized third party that handles the security service for the compromised information handling systems. In another embodiment, each child virtual security driver sends the update after the execution of the security feature.

The virtual security device driver may send the update for each security feature that was executed. The update may include a status, such as whether the security feature was successfully executed, how much data has been downloaded, recovered, and/or erased from the storage device, etc. The update may also include whether the operating system has been frozen or locked down and/or a message displayed to the current possessor of the information handling device. The update may also include a notification to the manufacturer or authorized third party to remove the service tag of the information handling system in the next revision or update of the driver. After sending the update, the method ends.

Figure 6:
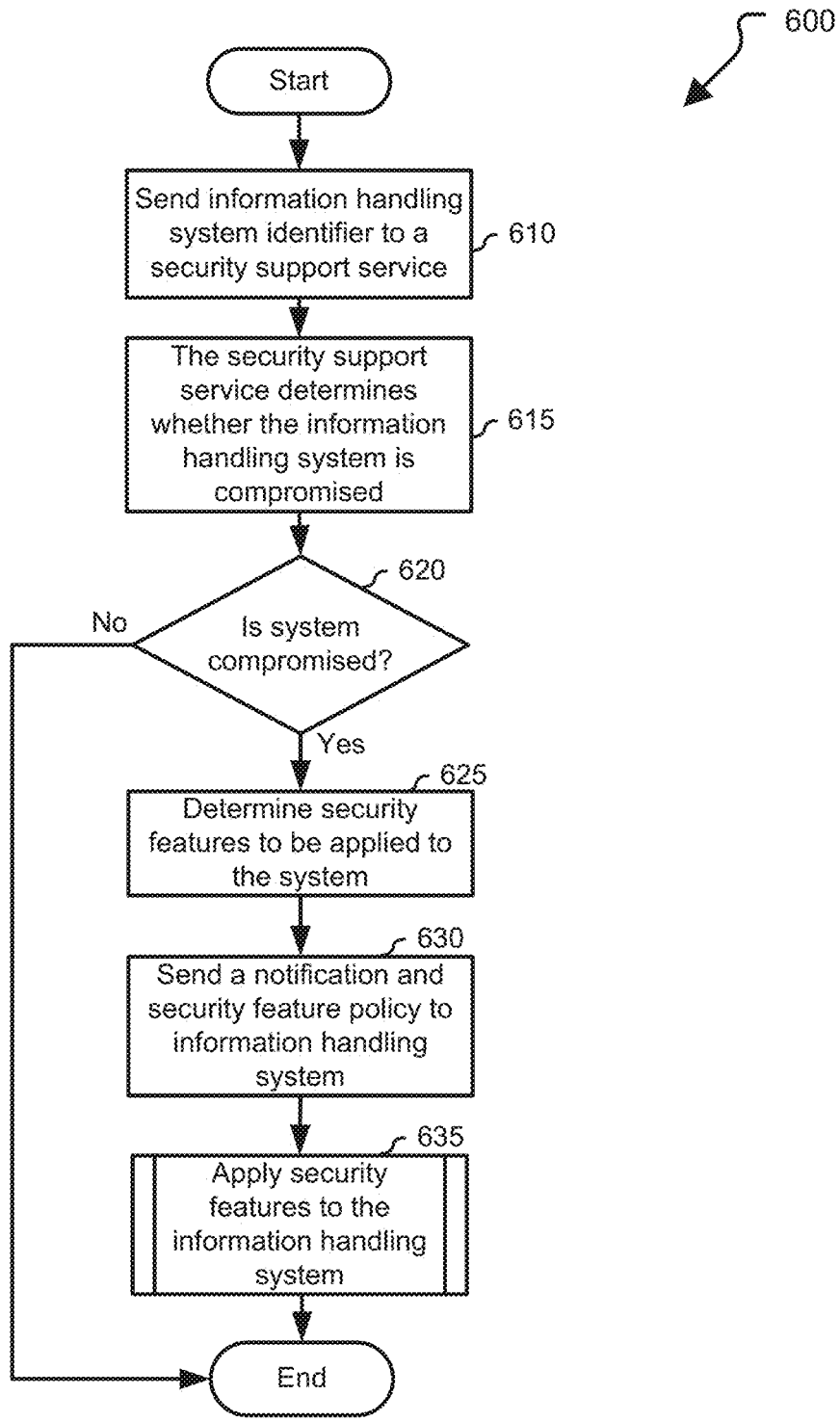

FIG. 6 illustrates a method 600 for implementing security features to a compromised information handling system at driver runtime. In particular, method 600 is a detailed illustration of block 450 of FIG. 4. Typically, the method 600 starts at block 610.

At block 610, a security device driver transmits an information handling system identifier to a support site of the manufacturer of the information handling system. In particular, a parent virtual device driver may transmit a service tag of the information handling system to a security support service of the manufacturer of the information handling system or a third party provider. The security device driver may transmit the information handling system identifier periodically such as daily, weekly, monthly, etc. or on demand. The method proceeds to block 615, wherein upon receipt of the information handling system identifier, the security support service validates the information handling system identifier. In particular, the security support service determines whether the information handling system is compromised. The method proceeds to decision block 620 where a decision is made on whether the information handling system is compromised. If the information handling system is compromised, then the "YES" branch of decision block 620 is taken and the method proceeds to block 625. If the information handling system is not compromised, then the "NO" branch of decision block 620 is taken and the method ends.

At block 625, the method or in particular, the security support service determines the security features to be applied or executed at the information handling system. After determining the security features, the security support service sends a message to the security device driver at block 630. The message may include a notification and a security feature policy that includes the security features to be applied to the information handling system. In particular the security feature policy may include the drivers and/or location of the drivers associated with the security features. The method then proceeds to block 635 where the security features are applied to the system similar to block 522 of FIG. 5. The security features may be applied by the security device driver, a parent virtual security device driver or similar.

Although FIG. 3, FIG. 4, FIG. 5 and FIG. 6 show example blocks of method 300, method 400, method 500, and method 600, in some implementation, method 300, method 400, method 500, and method 600 may include additional blocks, fewer blocks, different blocks, or differently arranged blocks than those depicted in FIG. 3, FIG. 4, FIG. 5, and FIG. 6. Additionally, or alternatively, two or more of the blocks of method 300, method 400, method 500, or method 600 may be performed in parallel. For example, although method 300 typically starts at block 305, subsequent to the first power-on a flag may be set and the method may start at decision block 315 instead. In another example, although blocks 530, 535, 540, 545, and 550 talks about virtual child security drivers, the virtual security device drivers in these blocks may not be a driver for a child device but a driver for an independent virtual device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   downloading, by a processor of an information handling system, a device driver for a virtual advanced configuration and power interface device, wherein the device driver includes a code for a security feature and a signed file that includes a list of identifiers of compromised information handling systems;

determining whether the information handling system is compromised based on the list of identifiers of compromised information handling systems; and in response to the determining that the information handling system is compromised, executing the code for the security feature, wherein the security feature is one of security features that include downloading data in a storage device of the information handling system, erasing the data in the storage device of the information handling system, and encrypting the data in the storage device of the information handling system.

2. The method of claim 1, wherein the security feature is selected by an owner of the information handling system.

3. The method of claim 1, further comprising subsequent to the executing the security feature, sending a notification to a manufacturer of the information handling system.

4. The method of claim 3, further comprising subsequent to the sending the notification, incrementing a version of the device driver.

5. The method of claim 1, wherein the security features can be selected by an owner of the information handling system.

6. The method of claim 5, wherein the security features include installing a password to access the information handling system and freezing an operating system of the information handling system.

7. The method of claim 1, wherein each one of the security features is associated with a particular virtual advanced configuration and power interface device.

8. The method of claim 1, further comprising subsequent to the executing the code for the security feature, executing a second code associated a second security feature selected by an owner of the information handling system.

9. The method of claim 1, wherein the virtual advanced configuration and power interface device is added to a basic input/output system.

10. The method of claim 1, further comprising integrating a security library of the device driver to a hardware component of the information handling system.

11. An information handling system, comprising:
a basic input/output system that includes a virtual advanced configuration and power interface device; and
a processor configured to:
download a device driver for a particular virtual advanced configuration and power interface device, wherein the device driver includes a code for a security feature and a signed file that includes a list of identifiers of compromised information handling systems, and wherein the particular virtual advanced configuration and power interface device is disabled;
determine whether the information handling system is compromised based on the list of identifiers of compromised information handling systems in the signed file; and
in response to a determination that the information handling system is compromised, enable the particular virtual advanced configuration and power interface device and execute the code for the security feature.

12. The information handling system of claim 11, wherein the particular virtual advanced configuration and power interface device is a child of the virtual advanced configuration and power interface device.

13. The information handling system of claim 11, wherein the particular virtual advanced configuration and power interface device is added during power on self-test of the basic input/output system.

14. The information handling system of claim 11, wherein the virtual advanced configuration and power interface device is added during manufacture of the information handling system.

15. The information handling system of claim 11, wherein the execution of the code for the security feature is performed during device driver runtime.

16. A method comprising:
adding, by a processor while booting an information handling system, an advanced configuration and power interface device to a basic input/output system of the information handling system;
receiving, at the information handling system, an update for an advanced configuration and power interface device driver associated with the advanced configuration and power interface device, wherein the update includes a signed file with a list of compromised information handling systems; and
when the information handling system is compromised based on the list of compromised information handling systems, then installing the advanced configuration and power interface device driver that includes a code to apply a security feature selected by an owner of the information handling system and applying the security feature, wherein the security feature is one of security features that include installing a password to access the information handling system and freezing an operating system of the information handling system.

17. The method of claim 16, further comprising updating a manufacturer of the information handling system that the advanced configuration and power interface device driver has been installed and the security feature has been applied.

18. The method of claim 17, further comprising incrementing a version number of the advanced configuration and power interface device driver subsequent to the updating the signed file.

19. The method of claim 16, further comprising adding a security library of the advanced configuration and power interface device driver to a hardware component of the information handling system.

20. The method of claim 16, further comprising verifying a signature of the signed file prior to the installing the advanced configuration and power interface device driver.

* * * * *